United States Patent [19]
Klass

[11] 3,856,492
[45] Dec. 24, 1974

[54] HYDRATE FORMING IN WATER DESALINATION

[75] Inventor: Donald L. Klass, Barrington, Ill.

[73] Assignee: The Institute of Gas Technology, Chicago, Ill.

[22] Filed: May 5, 1972

[21] Appl. No.: 250,791

Related U.S. Application Data

[63] Continuation-in-part of Ser. No. 880,734, Nov. 28, 1969, abandoned.

[52] U.S. Cl.................... 62/58, 210/54, 260/676 H
[51] Int. Cl............................................. B01d 9/04
[58] Field of Search..................... 62/58; 260/676 H

[56] References Cited
UNITED STATES PATENTS

| | | |
|---|---|---|
| 2,974,102 | 3/1961 | Williams ................................ 62/58 |
| 3,132,096 | 5/1964 | Walton ................................... 62/58 |
| 3,214,371 | 10/1965 | Tuwiner................................. 62/58 |
| 3,217,505 | 11/1965 | Tuwiner................................. 62/58 |
| 3,250,081 | 5/1966 | Othmer.................................. 62/58 |
| 3,269,136 | 8/1966 | Umano .................................. 62/58 |
| 3,399,538 | 9/1968 | Sliepcevich........................... 62/58 |

Primary Examiner—Norman Yudkoff
Assistant Examiner—Hiram H. Bernstein
Attorney, Agent, or Firm—Alexander and Speckman

[57] ABSTRACT

An improved process of water desalinization and in particular a method of producing potable water from sea water by a hydration process using a heat-exchange liquid which is immiscible in water and is a solvent for a gaseous hydrating agent to store a major portion of the heat of hydration which is used directly for hydrate decomposition.

14 Claims, 4 Drawing Figures

INVENTOR
Donald L. Klass

BY *Alexander & Speckman*
ATTYS.

PHASE DIAGRAM FOR PROPANE
AND
WATER MIXTURES

HYDRATE FORMING IN WATER DESALINATION

CROSS-REFERENCE TO RELATED APPLICATION

This application is a Continuation-In-Part application of my co-pending application Ser. No. 880,734 filed Nov. 28, 1969 and now abandoned.

Scarcity of potable water is a growing problem today in many parts of the earth because of increasing demands of an increasing population and growing pollution problems. In some parts of the world, sea water must be looked to as nearly the only source of potable water. In others where fresh water is available, pollution has made purification a necessity.

The major concern in the production of potable water by desalinization is cost. Current methods of desalinization, such as the membrane method, the diffusion method, electrodialysis, flash distillation, freezing and current methods of hydration, entail costs which make desalinized water unavailable for wide varieties of users. Output limitations, mechanical complications, energy requirements and product purity are problems which plague the field, and have made it impractical to use any of the above-mentioned methods for more than limited purposes. There is a definite need for improvement in desalinization methods which will make desalinized water available to meet growing demands now and in the future.

In particular, hydration purification methods known in the art have presented several problems. Hydration systems have been complicated in structure and thus have posed severe operational problems. Specifically, in methods of the prior art, hydration has occured by removal of heat from brine and a hydrating agent through metallic heat transfer surfaces on which solids form causing problems of scaling and fouling commonly associated with heat exchangers having metallic heat transfer surfaces in saline water conversion applications. Also, when the solid hydrate was formed, the heat of hydration was either largely lost in the resulting more concentrated brine or was inefficiently transferred by means of metallic heat transfer surfaces with the attendant aforementioned problems of scaling and fouling, as well as substantial energy loss because of high thermal barrier. Thus, prior attempts to conserve the thermal energy released upon hydration for later use have been inefficient. Furthermore, in methods of the prior art, hydrate has been removed from the reaction area in the form of a briny slurry. Pumping the thick slurry gives rise to considerable mechanical problems and high pumping costs. In addition, without complicated hydrate washing, the product water had high salt content. And, if hydrate washing procedures were used, the portion of product water used for said washing was lost.

Some prior purification methods known in the art have relied upon ice formation for desalinization of sea water. Exemplary of such processes are those set forth in U.S. Pat. Nos. 3,214,371, "Desalination by Freezing", S. B. Tuwiner, issued Oct. 26, 1965; 3,399,538, "Method For Separating Relatively Pure Water From Aqueous Solutions", C. M. Sliepcevich, et al. issued Sept. 3, 1968; 3,250,081, "Process for Freezing Water From Solutions to Make Fresh Water or Concentrated Solutions", D. F. Othmer, issued May 10, 1966; and 3,269,136, "Apparatus For Separation of Solvent From Solute By Freezing", Shuji Umano, issued Aug. 30, 1966. One of the principal disadvantages of desalinization relying upon ice formation is the relatively high energy input to obtain ice formation. Another disadvantage of such methods is the necessary washing of ice with pure water to minimize salt content of the product. Further, the investment in apparatus required for methods of desalinization relying upon freezing is higher than desired.

My invention provides a new process for desalinization by hydration which overcomes the aforementioned problems. My invention provides a method of desalinization by hydration which requires equipment of a relatively uncomplicated nature with respect to the equipment required by methods of the prior art. Specifically, in the method of my invention, removal of heat from brine and hydrating agent need not be accomplished through metallic heat transfer surfaces. In the process of my invention, heat transfer to cause the formation of solid hydrate may be accomplished by directly contacting brine with a heat-exchange liquid which is immiscible with brine and has a dissolved gaseous hydrating agent. When there is no metallic heat transfer surface, the problems of scaling and fouling commonly associated with heat exchangers having metallic heat transfer surfaces in saline water conversion applications are eliminated.

Furthermore, in the process of my invention, a large amount of heat of hydration is conserved for later use in decomposition of the solid hydrate and is efficiently transferred to said hydrate by means of direct contact between heat-exchange liquid and solid hydrate. The use of a relatively higher thermal barrier has been eliminated in the process of my invention.

The hydrate formed in the process of my invention is a compound or complex ion formed by the union of water with some other substance and represented as actually containing water. Thus, it is clear that a hydrate does not include ice. The process of my invention eliminates the high energy requirements for freezing and also eliminates the necessity of washing ice with pure water.

In addition, my invention has eliminated the problems of moving a thick slurry, existing in prior art processes. In prior art processes, a thick briny slurry formed in the vessel in which hydration occurred. A slurry which would flow easily would necessarily have a very high salt content, since the slurry was composed of solid hydrate and brine. If the salt content was reduced, that is, there was less brine and more solid hydrate, the problems of slurry pumping intensified. In methods of the prior art, there was a choice between impure product or severe pumping problems. Washing the solid hydrate was at best an unsatisfactory solution to this dilemma. The washing process is complicated, requires a loss of a portion of product water for washing, and, in fact, does not eliminate the problems of pumping a slurry. My invention overcomes this problem by providing a heat-exchange liquid, in which hydrate crystals are insoluble, to transport the solid hydrate. The amount of solid hydrate in the heat-exchange liquid can easily be controlled such that the heat-exchange liquid and hydrate contained therein always flow freely. Furthermore, the problem of salt in the product is substantially eliminated by my process. Since the brine and heat-exchange liquid are immiscible, and the solid hydrate is carried by the heat-exchange liquid, virtually no brine will be carried with the solid hydrate. Desalinized water produced by the method of my invention therefore has a high degree of purity.

In the process of my invention, a gaseous hydrating agent is dissolved in a liquid which is immiscible with water and brine, forming a solution which is immiscible with water and brine. During operation of my process, some gaseous hydrating agent will be dissolved in the liquid which is immiscible with water and brine, although the concentration will vary. The term "heat-exchange liquid" as used herein, refers to the solution of gaseous hydrating agent in the liquid immiscible with brine and water, regardless of the concentration.

Heat-exchange liquid is first commingled with brine. Then the heat-exchange liquid and brine are subjected to pressure and temperature conditions which will allow the hydration reaction to occur. The hydration reaction, of the dissolved gaseous hydrating agent with the water in the brine, can occur by subjecting the heat-exchange liquid and brine to suitable pressure and temperature conditions. Such conditions are determined by reference to the hydrate phase diagram for the gas being used. The ranges of both temperature and pressure at which hydration or decomposition of hydrate will occur are limited by the phase diagram. However, within these ranges the formation or decomposition of solid hydrate can occur either by changing pressure, changing temperature or both. Formation of hydrate may be accomplished in a hydrate formation zone by lower temperature, higher pressure or a combination thereof. The temperature in the hydration zone is above the ice formation temperature, dependent upon the salinity of the brine, generally just below 32°F and up to the boiling temperature of water, 220° F. Suitable pressures are atmospheric and above. Such pressures depend upon the phase diagram of the gaseous hydrating agent used. In a preferred embodiment of my process, the brine and heat-exchange liquid before commingling are placed under pressure conditions which, at a suitable temperature, would allow the hydration reaction to occur. The heat-exchange liquid, before commingling, is at an initial temperature lower than the initial ambient temperature of the brine and below the highest temperature at which the dissolved gaseous hydrating agent will react with water to form a solid hydrate. As the brine and the heat-exchange liquid commingle, heat is transferred from the warmer brine to the cooler heat-exchange liquid, and the contacting liquids will achieve reaction temperature for the prevailing pressure and formation of hydrate will occur.

The solid hydrate is insoluble in the heat-exchange liquid. In a typical embodiment of my invention, a heat-exchange liquid, with a specific gravity lower than the specific gravities of both water and brine, and the gaseous hydrating agent will be chosen such that the specific gravity of the solid hydrate formed is equal to or lower than the specific gravity of the heat-exchange liquid. Thus, after the heat-exchange liquid and brine are commingled in a hydrate formation zone and a solid hydrate is formed, the solution and the solid hydrate will move to the top of a hydrate formation vessel, while the brine, now more concentrated, will move to the bottom of the hydrate formation vessel. The solid hydrate crystals will be removed from the hydrate formation vessel with the heat-exchange liquid, and since the brine has moved to the bottom of the vessel, no brine will be removed with the solid hydrate. Since the solid hydrate crystals are carried away from the hydrate formation zone in a liquid, there are no problems of pumping a thick slurry.

The heat-exchange liquid, which is removed carrying the solid hydrate, will also carry a major portion of the heat of hydration which it absorbed during the hydration reaction. This heat, a portion of the heat of hydration, will subsequently aid in decomposition of the solid hydrate to pure water and gaseous hydrating agent in a hydrate decomposition zone by transfer directly from said heat-exchange liquid. The said hydrate is decomposed directly into water.

Decomposition may be accomplished in a hydrate decomposition zone by higher temperature, lower pressure or a combination thereof. The heat of hydration preserved in the heat-exchange liquid is utilized in achieving decomposition. After passing the hydrate decomposition zone, heat-exchange liquid and products of decomposition of solid hydrate are separated, by virtue of their varying specific gravities, in a separator vessel. The product, water, will be withdrawn from the bottom of the separator vessel, whereas the heat-exchange liquid, with its dissolved gaseous hydrating agent, will be withdrawn from a higher position in the separator vessel. Above the heat-exchange liquid, there may be some gaseous hydrating agent which has not returned to solution in the heat-exchange liquid. This maintains pressure on the heat-exchange liquid so that the amount of dissolved gaseous hydrating agent remains high.

One object of my invention is to provide a simplified, economical and efficient process of producing potable water from sea water and other salt waters.

Another object of my invention is to provide a desalinization process eliminating the necessity to pump a slurry.

Another object is to provide a desalinization process having efficient conservation of heat of hydration for later use in hydrate decomposition.

A further object of my invention is to provide a process for desalinization having no metallic heat transfer surfaces on which solids form.

A still further object of my invention is to provide a desalinization process which produces desalinized water of a high degree of purity, eliminating the necessity of washing solid hydrate before decomposition.

Yet another object of my invention is to provide a desalinization process using the same material both as a heat-exchange liquid and hydrating agent.

Another object of my invention is to provide a desalinization process which does not require ice formation.

These and other important objects will become apparent from the following description and from the drawings showing preferred embodiment wherein.

Figure 1:
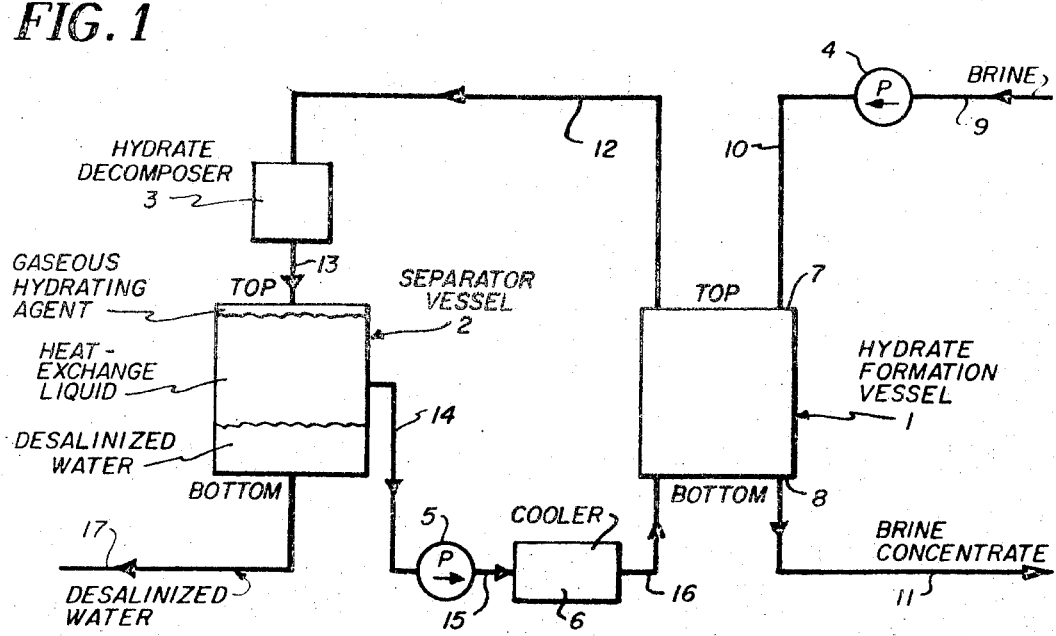
FIG. 1 is a schematic diagram of an embodiment of the process of my invention using a heat-exchange liquid with a specific gravity lower than the specific gravities of brine and water.
Figure 2:
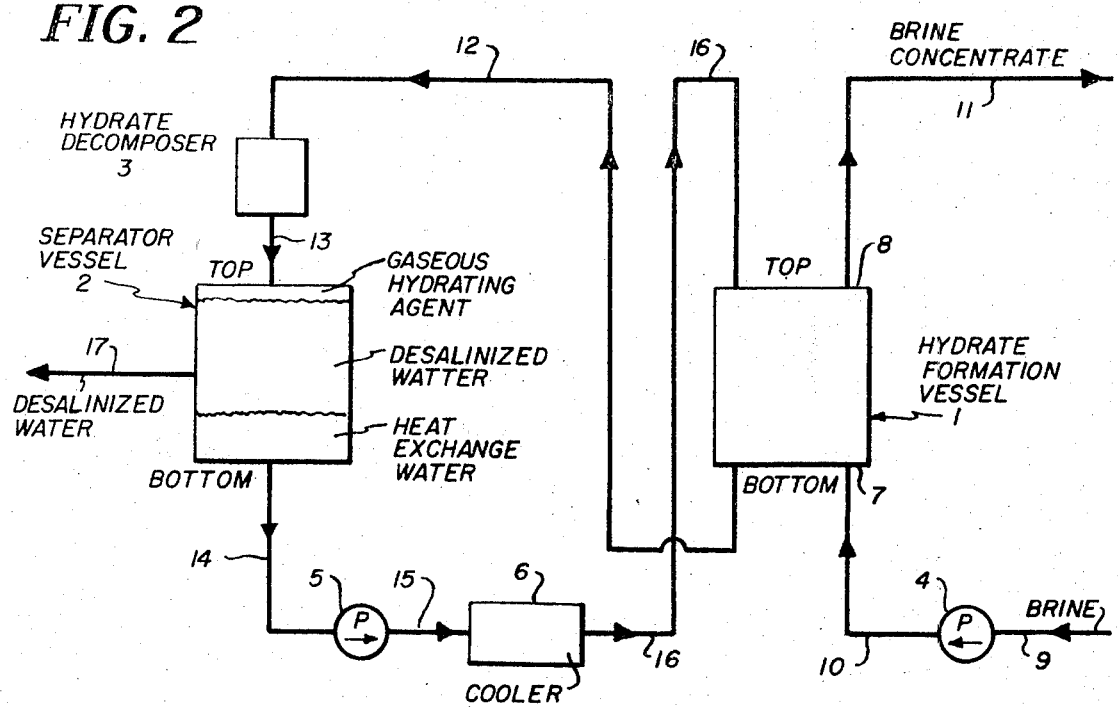
FIG. 2 is a schematic diagram of a system embodying the process of my invention, using a heat-exchange liquid with a specific gravity greater than the specific gravity of brine and water.
Figure 3:
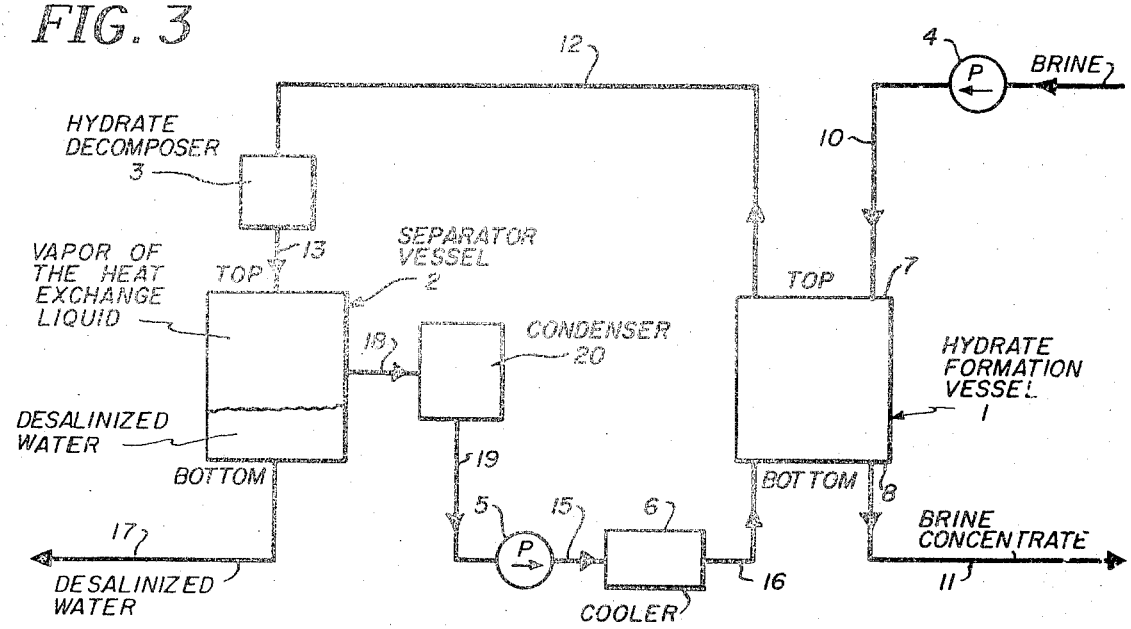
FIG. 3 is a schematic diagram of an embodiment of the process of my invention having propane as heat-exchange liquid and hydrating agent.

Referring specifically to FIGS. 1–3, schematic drawings of systems embodying this invention are shown having hydrate formation vessel 1, separator vessel 2, hydrate decomposer 3, brine compressor-pump 4, heat-exchange liquid compressor-pump 5, cooler 6, formation vessel first end 7, formation vessel second end 8, and pipelines 9 through 17.

Brine, usually sea water, passes through line 9 to brine compressor-pump 4 where its pressure is adjusted to a pressure within the range of pressures at which water will react with the gaseous hydrating agent used in this system. From the brine compressor-pump, the brine is pumped to the hydrate formation vessel through pipeline 10. The brine enters the hydrate formation vessel at or near formation vessel first end 7. A heat-exchange liquid, which has been adjusted to substantially the same pressure as was the brine by heat-exchange liquid compressor-pump 5, and cooled, by cooling means 6, to a temperature below both the initial temperature of the brine and below the highest temperature of the temperature range at which the hydrating agent used and water will react to form solid hydrate under the pressures which compressor-pumps 4 and 5 achieved, is pumped by heat-exchange liquid compressor-pump 5 through pipeline 16 into the hydrate formation vessel. The heat-exchange liquid enters the vessel at or near formation vessel second end 8. The hydrate formation vessel is full of liquid, both brine and heat-exchange liquid.

The heat-exchange liquids used are substantially immiscible with brine and water. The heat-exchange liquids are also solvents for gaseous hydrating agents which will react with water at the pressures which compressor-pumps 4 and 5 achieved and at a temperature between the initial temperature of the heat-exchange liquid, its temperature in pipeline 16, and the initial temperature of the brine, the brine temperature in pipeline 10.

Referring specifically to FIG. 1, the heat-exchange liquid has a specific gravity lower than the specific gravities of both brine and water. The gaseous hydrating agent forms a hydrate having a specific gravity also lower than the specific gravities of brine and water, and preferably equal to or lower than the specific gravity of the heat-exchange liquid. The pumping actions of compressor-pumps 4 and 5 and the difference in the specific gravities of brine and the heat-exchange liquid cause the heat-exchange liquid in the hydrate formation vessel to move upward while the brine moves downward. The heat-exchange liquid typically will be introduced into the hydrate formation vessel through a sparger device, dispersing the heat-exchange liquid, thereby increasing the surface area of contact of brine with heat-exchange liquid. Other means, such as baffles or an agitator, may be used to disperse the heat-exchange liquid as it passes through the brine. The degree of dispersion will affect the amount of solid hydrate formed, because greater dispersion provides greater contact between brine and heat-exchange liquid. Solid hydrate will form at the liquid contact surfaces of brine and heat-exchange liquid in the hydrate formation vessel. The heat-exchange liquid, being at a temperature below the highest temperature at which the hydration reaction will occur, will receive heat from the warmer brine. The lower the initial temperature of the heat-exchange liquid, the greater will be the amount of solid hydrate formed. Heat of hydration is released as formation of hydrate occurs in the hydrate formation vessel.

The solid hydrate, which has a specific gravity lower than the specific gravities of brine and water, will also move in an upward direction in the hydrate formation vessel. Preferably, the specific gravity of the solid hydrate will be equal to or lower than the specific gravity of the heat-exchange liquid, thereby causing the solid hydrate to move throughout the heat-exchange liquid in the upper part of the hydrate formation vessel or move generally to the top portion of the heat-exchange liquid at the top of the hydrate formation vessel.

The solid hydrate is withdrawn from the hydrate formation vessel in the heat-exchange liquid. The volume of liquid being high with respect to the volume of solid hydrate, there are not problems of pumping a slurry. Since the brine and heat-exchange liquid are separated in the hydrate formation vessel, there is practically no brine withdrawn with the solid hydrate and heat-exchange liquid. The solid hydrate and heat-exchange liquid are withdrawn from the hydrate formation vessel through pipeline 12 and move to hydrate decomposer 3. Hydrate decomposer 3 and pipeline 12 comprise a decomposition zone. That is, in this zone decomposition of the solid hydrate into pure water and gaseous hydrating agent will occur. Some decomposition may occur in pipeline 12 by virtue of the heat of hydration carried away from the hydrate formation vessel in the heat-exchange liquid. Most of the decomposition will generally occur, however, in the hydrate decomposer.

The hydrate decomposer causes the decomposition of the solid hydrate by adding heat to the heat-exchange liquid and solid hydrate, or by lowering the pressure of the heat-exchange liquid and solid hydrate, or by a combination of heating and lowering of pressure. Addition of heat may be accomplished by any external means, including utilization of a metallic heat-exchange surface. Using a heat-exchange surface here will not cause problems of scaling and fouling because the hydrate is being decomposed rather than being formed. The amount of heat which need be added to accomplish decomposition of the solid hydrate is low by virtue of the fact that heat of hydration was transferred from the hydrate formation vessel to the hydrate decomposer in the heat-exchange liquid, and thus preserved for decomposition. If lowering the pressure is used, it may be accomplished, for example, by passing the heat-exchange liquid and solid hydrate through an expansion valve, or by any other suitable means. After decomposition, the products of the decomposition, gaseous hydrating agent, whether dissolved in heat-exchange liquid or not, and water, and the heat-exchange liquid will be carried by pipeline 13 to separator vessel 2. In the separator vessel, the desalinized water, a product of decomposition of the solid hydrate, will flow to the bottom of the separator vessel by virtue of its specific gravity being higher than the specific gravity of the heat-exchange liquid. Heat-exchange liquid will be above the desalinized water. Above the heat-exchange liquid will be some undissolved gaseous hydrating agent, which is part of the product of the decomposition. Part of this gas will stay dissolved in the heat-exchange liquid, and by virtue of the pressure of the gas on the liquid in the separator vessel, the amount of gaseous hydrating agent in solution will remain substantially constant.

The desalinized water, the product of this process, will be withdrawn from the separator vessel through pipeline 17. Heat-exchange liquid will be withdrawn from the separator vessel through pipeline 14, and will be adjusted again to the pressure and temperature conditions necessary for reaction by the heat-exchange liquid compressor-pump 5 and cooler 6. The heat-exchange liquid will continuously be recirculated in the manner described.

Referring specifically to FIG. 2, a schematic drawing of another system embodying the process of my invention is shown. The major difference between the system of FIG. 1 and the system of FIG. 2 is that, in the system of FIG. 2, the specific gravities of the heat-exchange liquid and solid hydrate are higher than the specific gravities of brine and water. It is preferred that the specific gravity of the solid hydrate be equal to or even higher than the specific gravity of the heat-exchange liquid used in the system of FIG. 2. When the brine and heat-exchange liquid, having dissolved gaseous hydrating agent, commingle in the hydrate formation vessel of FIG. 2, and hydrate is formed, the brine concentrate will move to the top of the hydrate formation vessel whereas the heat-exchange liquid and solid hydrate will move toward the bottom. In the separator vessel, heat-exchange liquid, with dissolved gaseous hydrating agent, will move to the bottom whereas the desalinized water will be nearer the top. As in the system of FIG. 1, the undissolved gaseous hydrating agent will remain at the top of the separator vessel.

Referring specifically to FIG. 3, a schematic drawing of another embodiment of the process of my invention is shown. In the process of FIG. 3, the heat-exchange liquid is also the hydrating agent. After decomposition of the hydrate in the hydrate decomposition zone, the decomposition products, desalinized water and liquid and vapor of the heat-exchange liquid separate in the separator vessel. Liquid and vapor of the heat-exchange liquid are withdrawn through pipeline 18, the vapor is condensed in condenser 20, and heat-exchange liquid is then withdrawn through pipeline 19 to the heat-exchange liquid compressor-pump and cooler as in the systems of FIGS. 1 and 2.

Figure 4:
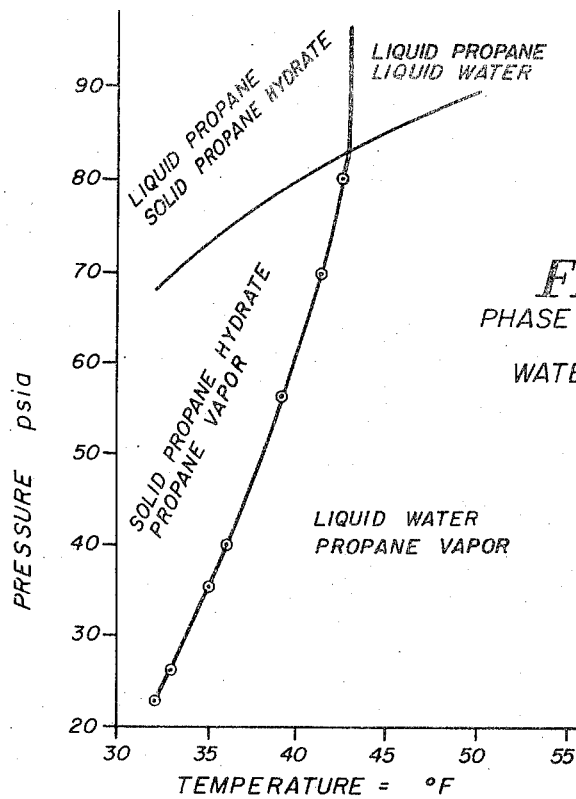
FIG. 4 is a graph showing phase diagrams for liquid and gaseous propane and solid propane hydrate.

FIG. 4 is a graph showing the liquid-vapor phase diagram for propane, a chemical especially suited for the process of FIG. 3, and the hydration phase diagram for propane hydrate and propane gas with water. Pressure and temperature conditions of on or above the liquid-vapor line and above the hydration line must be obtained in the hydrate formation vessel to accomplish the desired hydration reaction, and pressure and temperature conditions of on or below the hydration line must be obtained in the hydrate decomposition zone. Since the hydration zone is maintained at temperatures above ice formation, ice crystals will not form.

In the processes of FIGS. 1-3, as in all embodiments of my invention, various adjustments, which are obvious to one skilled in the art and familiar with this invention, may be made to regulate the continued operation of the process properly. These include adjustments in feed volumes, temperatures, pressures, flow ratios and degrees of aforementioned commingling.

In each of the processes of FIGS. 1-3, countercurrent flow of brine and heat-exchange liquid was used. Although countercurrent flow is preferred, commingling in other ways, such as cocurrent flow, is also suitable.

In the embodiments shown in FIGS. 1-3, the hydrate formation zone and hydrate formation vessels are coextensive, as the brine and heat-exchange liquid are in contact only in the hydrate formation vessels. The hydrate formation zone exists, however, wherever brine and heat-exchange liquid are commingled at pressure and temperature conditions allowing the hydration reaction to occur, and are thereafter, with the solid hydrate, allowed to separate by virtue of their immiscibility and differing specific gravities. Thus, after commingling begins, the heat-exchange liquid and brine may be subjected to the required reaction conditions. At some point in the hydrate formation zone, the concentrated brine, solid hydrate and heat-exchange liquid must be allowed to separate by virtue of immiscibility and differing specific gravities.

In some cases, cooling of brine before commingling might be desirable.

Any physical apparatus which will provide or allow the conditions for hydration, decomposition and separation required in the hydrate formation zone and hydrate decomposition zone is suitable for the practice of the process of my invention. Widely varying apparatus will be suitable. Corrosion-resistant stainless steel apparatus is an example of suitable apparatus. Other suitable apparatus will be obvious to one skilled in the art and familiar with this invention.

The processes described are continuous in nature. The benefits of this invention may also be obtained, however, by non-continuous processes which use a heat-exchange liquid which is immiscible in water, is a solvent for a gaseous hydrating agent, and has a specific gravity different from that of water.

There are a large number of heat-exchange liquids which are suitable for use in the process of my invention. Any liquid which is substantially immiscible in water, has a specific gravity not in the specific gravity range of brine and water, and is a solvent for a gaseous hydrating agent may be suitable. Liquids with high specific heats are preferred.

Preferred heat-exchange liquids include organic hydrocarbons and mixtures thereof. Liquid aliphatic hydrocarbons having about 1 to 20 carbon atoms are suitable. Straight chain, branched chain and cyclic aliphatic hydrocarbons may be used. Liquid aromatic hydrocarbons having mono-, di- and tri-carbocyclic structures are suitable.

Suitable organic liquids for use as heat-exchange liquids include aliphatic compounds such as methane and liquid natural gas (LNG), ethane, propane, butane, pentane, hexane, heptane, octane, nonene, decane, undecane, dodecane, tridecane, tetradecane, pentadecane, hexadecane, heptadecane, octadecane, nonadecane, eicosane, and cyclic derivatives such as cyclohexane, methyl cyclopentane, cyclopentane, benzene, toluene, anisole, cyclic and acyclic terpenes such as dipentene and pine oils, substituted aliphatic hydrocarbons such as carbontetrachloride, ethylene dichloride, dichloroethylene, ethers, esters, and aromatic compounds such as phenylether, resorcinol, xylene, naphthalene, methylnaphthalene, biphenyl, tetrahydronaphthalene, anthracene, phenanthrene, alkylated benzene, naphthalenes, and anthracenes such as ethyl benzene, diethyl benzene, halogenated aromatic compounds such as bromo-benzene, chloro-benzene, chloro-naphthalene, chloro-anthracenes, and chloro-toluenes, and various petroleum fractions including kerosene, naphtha, mineral oil, odorless spirits, gasoline, and lubricating oils. Some of the above specific compounds have specific gravities above brine and water and others have specific gravities below brine and water. The above specific compounds are set forth only for exemplary purposes, appreciating that many more organic compounds are suitable as long as it is substantially immiscible in water, is a solvent for the gaseous hydrating agent utilized and has a specific gravity different from the specific gravity range of brine and water.

Some hydrating agents are suitable for use as a heat-exchange liquid in my process, performing both functions of the heat-exchange liquid and hydrating agent. One such compound is propane.

A number of gases are suitable for use as hydrating agents in my process. Any gas which dissolves in the heat-exchange liquid being used and reacts with water to form a hydrate is suitable. The gas should be substantially less soluble in water than in the heat-exchange liquid. Substantial insolubility in water is preferred. The gas must form a hydrate which has a specific gravity on the same side of the specific gravity of water and brine as the specific gravity of the heat-exchange liquid. Examples of preferred gaseous hydrating agents for use in my process are methane, ethane, ethylene, propylene, propane, isobutane, n-butane, carbon dioxide, methyl chloride, chlorine and methyl bromide.

EXAMPLE 1

The following chart shows the phases and materials, pressures and temperatures at various points of flow in the process as shown in FIG. 1, using mineral spirits as heat-exchange liquid and ethane as dissolved gaseous hydrating agent:

| PIPELINE | PHASES AND MATERIALS | PRESSURE (psia) | TEMPERATURE (°F) |
|---|---|---|---|
| 9 | Liquid brine | 14.7 | 80 |
| 10 | do. | 380 | 80 |
| 11 | do. | 380 | 70 |
| 16 | Mineral spirits—ethane solution | 380 | 45 |
| 12 | Solution and solid hydrate | 380 | 55 |
| 17 | Desalinized liquid water | 175 | 55 |
| 14 | Mineral spirits—ethane solution | 175 | 55 |

EXAMPLE 2

The following chart shows the phases and materials, pressures and temperatures at various points of flow in the process as shown in FIG. 1, using mineral spirits as heat-exchange liquid and propane as dissolved gaseous hydrating agent:

| PIPELINE | PHASE AND MATERIAL | PRESSURE (psia) | TEMPERATURE (°F) |
|---|---|---|---|
| 9 | Liquid brine | 14.7 | 70 |
| 10 | do. | 80 | 70 |
| 11 | do. | 80 | 60 |
| 16 | Mineral spirits—propane solution | 80 | 20 |
| 12 | Solution and solid hydrate | 80 | 42 |
| 17 | Desalinized liquid water | 40 | 50 |
| 14 | Mineral spirits—propane solution | 40 | 50 |

EXAMPLE 3

The following chart shows the phases and materials, pressures and temperatures at various points of flow in the process as shown in FIG. 3, using propane as both heat-exchange liquid and hydrating agent:

| PIPELINE | PHASES AND MATERIALS | PRESSURE (psia) | TEMPERATURE (°F) |
|---|---|---|---|
| 9 | Liquid brine | 10.7 | 75 |
| 10 | do. | 85 | 75 |
| 11 | do. | 85 | 40 |
| 16 | Liquid propane | 85 | 20 |
| 12 | Liquid propane and solid hydrate | 85 | 40 |
| 17 | Desalinized liquid water | 58 | 40 |
| 14 | Liquid propane | 58 | 40 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for water desalinization comprising the steps of: commingling in a hydrate formation zone at a temperature above ice formation, brine and a heat-exchange liquid which is substantially immiscible with brine and water, has a specific gravity different from the specific gravities of brine, water and the range therebetween and has a dissolved gaseous hydrating agent therein, said hydrating agent being capable of forming a solid hydrate having a specific gravity on the same side of the specific gravity of both water and brine as the specific gravity of said heat-exchange liquid and being substantially insoluble in said heat-exchange liquid; adjusting temperature, pressure or a combination thereof to form a solid hydrate and a portion of the heat of hydration being absorbed by said heat-exchange liquid; withdrawing concentrated brine from said hydrate formation zone separate from said heat-exchange liquid and solid hydrate; withdrawing said heat-exchange liquid and said solid hydrate from said hydrate formation zone to a hydrate decomposition zone; decomposing said solid hydrate, aided by said heat of hydration being transferred directly from said heat-exchange liquid, in said decomposition zone directly into water and gaseous hydrating agent; separating said heat-exchange liquid containing gaseous hydrating agent dissolved therein and desalinized water; and all of the process being conducted at temperatures above ice formation.

2. The process of claim 1 wherein said hydrate has specific gravity different than the specific gravities of brine, water and heat-exchange liquid and the specific gravities thereincluded.

3. The process of claim 1 wherein the pressure of said heat-exchange liquid and hydrate is lowered in said hydrate decomposer.

4. The process of claim 1 wherein the pressure of said heat-exchange liquid and hydrate is lowered and the temperature of said heat-exchange liquid and hydrate is raised in said hydrate decomposer.

5. The process of claim 1 wherein the temperature of said heat-exchange liquid and hydrate is raised in said hydrate decomposer.

6. The process of claim 1 wherein said heat-exchange liquid has initial temperature below the initial temperature of the brine and below the highest temperature at which said dissolved gaseous hydrating agent will react with water to form said hydrate at the pressure existing.

7. The process of claim 1 wherein said hydrate formation zone provides pressure and temperature conditions including subjecting the heat-exchange liquid and brine in said hydrate formation zone to higher pressure than existed within the heat-exchange liquid and brine before entry into said hydrate formation zone.

8. The process of claim 1 wherein said hydrate formation zone provides pressure and temperature conditions including subjecting the heat-exchange liquid and brine in said hydrate formation zone to lower temperature than existed within the heat-exchange liquid and brine before entry into said hydrate formation zone.

9. The process of claim 1 wherein said commingling is accomplished with countercurrent flow in said hydrate formation zone.

10. The process of claim 1 wherein said heat-exchange liquid is also the hydrating agent.

11. The process of claim 1 wherein said gaseous hydrating agent is selected from the group consisting of methane, ethane, ethylene, propylene, propane, isobutane, n-butane, carbon dioxide, methyl chloride, chlorine and methyl bromide.

12. The process of claim 1 wherein said heat-exchange liquid is selected from the group consisting of liquid aliphatic hydrocarbons having from 1 to 20 carbon atoms.

13. The process of claim 1 wherein said heat-exchange liquid is selected from the group consisting of liquid aromatic hydrocarbons having mono-, di- and tri-carbocyclic structures.

14. The process of claim 1 wherein said heat-exchange liquid is selected from the group consisting of kerosene, naphtha, mineral spirits, odorless mineral spirits, gasoline, mineral oil, lubricating oil, diphenyl, diphenyl oxide, hexane, heptane, octane, methylcyclopentane, cyclohexane, tetralin and benzene.

* * * * *